(12) United States Patent
De Souter et al.

(10) Patent No.: US 12,026,558 B2
(45) Date of Patent: Jul. 2, 2024

(54) INTEGRATION EXTENSIONS

(71) Applicant: UiPath, Inc., New York, NY (US)

(72) Inventors: Gunter De Souter, Denver, CO (US); Atul Madhukar Barve, Dallas, TX (US); Venkat Ramana Lashkar, Frisco, TX (US)

(73) Assignee: UiPath, Inc., New York, NY (US)

( * ) Notice: Subject to any disclaimer, the term of this patent is extended or adjusted under 35 U.S.C. 154(b) by 0 days.

(21) Appl. No.: 17/457,036

(22) Filed: Dec. 1, 2021

(65) Prior Publication Data

US 2023/0168949 A1 Jun. 1, 2023

(51) Int. Cl.
*G06F 3/00* (2006.01)
*G06F 9/54* (2006.01)

(52) U.S. Cl.
CPC .................................. *G06F 9/541* (2013.01)

(58) Field of Classification Search
CPC ........................................................ G06F 9/54
USPC ........................................................ 719/328
See application file for complete search history.

(56) References Cited

U.S. PATENT DOCUMENTS

| | | | | |
|---|---|---|---|---|
| 5,918,228 A * | 6/1999 | Rich | .................... | G06F 21/6218 |
| 6,185,608 B1 * | 2/2001 | Hon | .................... | G06F 16/9574 709/216 |
| 8,695,021 B2 | 4/2014 | Pierson et al. | | |
| 8,997,069 B2 | 3/2015 | Fanning et al. | | |
| 9,804,886 B1 * | 10/2017 | Wells | .................... | G06F 9/5033 |
| 10,362,141 B1 | 7/2019 | Thompson et al. | | |
| 10,425,465 B1 * | 9/2019 | Jha | .................... | H04L 67/565 |
| 10,942,732 B1 | 3/2021 | Chandrasekhar et al. | | |
| RE48,507 E * | 4/2021 | Palladino | .................. | G06F 9/44 |
| 2003/0177284 A1 * | 9/2003 | De Bonet | ........... | H04L 67/2871 719/328 |
| 2006/0206561 A1 * | 9/2006 | Chen | ................ | H04N 21/44227 375/E7.019 |
| 2009/0276667 A1 * | 11/2009 | Dopson | ................. | G06F 9/5027 709/227 |
| 2015/0012488 A1 * | 1/2015 | van Rossum | ....... | G06F 16/1767 707/611 |
| 2016/0286046 A1 * | 9/2016 | Lugiai | ................. | H04M 3/5183 |
| 2020/0304602 A1 * | 9/2020 | Melliere | ................. | H04L 67/02 |
| 2022/0121619 A1 * | 4/2022 | Sharma | ................. | G06F 16/122 |

FOREIGN PATENT DOCUMENTS

JP 2010067156 A * 3/2010

OTHER PUBLICATIONS

Hongchan Choi, WAAX: Web Audio API extension. (Year: 2013).*
Nicholas Jillings, Intelligent audio plugin framework for the Web Audio API. (Year: 2017).*

(Continued)

*Primary Examiner* — Lechi Truong
(74) *Attorney, Agent, or Firm* — Chiesa Shahinian & Giantomasi PC

(57) ABSTRACT

Systems and methods for integration of applications are provided. A request for data associated with a second application is received from a first application. The data associated with the second application is generated using one or more process extension APIs. The one or more process extension APIs generate the data using one or more native APIs of the second application. The data is transmitted to the first application.

9 Claims, 5 Drawing Sheets

(56) References Cited

OTHER PUBLICATIONS

Teppei Nakano, Extensible Speech Recognition System Using Proxy-Agent. (Year: 2007).*
Madhu Keshavamurthy, Plug-In Architecture for Mobile Devices. (Year: 2002).*
U. Nink, Generating Call-Level Interfaces for Advanced Database Application Programming. (Year: 1999).*
Jegadeesan, "SAP Integration Suite—The Hybrid Integration Platform for the Intelligent Enterprise," 2020, retrieved online at https://blogs.sap.com/2020/07/13/integration-for-intelligent-enterprises-integration-principles-platform-and-methodology/, 6 pgs.
Aico, "API integrations," retrieved online on Aug. 11, 2021 aico.ai/technology/connectivity/api-integrations/, 4 pgs.
Sandoval, "How To Make A Self-Descriptive Enterprise API," 2017, Nordic APIs, retrieved online at https://nordicapis.com/how-to-make-a-self-descriptive-enterprise-api/, 13 pgs.

* cited by examiner

INTEGRATION EXTENSIONS

TECHNICAL FIELD

The present invention relates generally to integration extensions, and more particularly to a connector for implementing integration extensions such as, e.g., process extensions and system extensions.

BACKGROUND

Many software providers offer suites or collections of computer programs of related functionality. Often times, software providers need to provide integration capabilities for integrating such computer programs. Conventionally, the integration capabilities of such computer programs have specific nuances that make integration a complex and labor-intensive process.

BRIEF SUMMARY OF THE INVENTION

In accordance with one or more embodiments, systems and methods for integration of applications are provided. A request for data associated with a second application is received from a first application. The data associated with the second application is generated using one or more process extension APIs. The one or more process extension APIs generate the data using one or more native APIs of the second application. The data is transmitted to the first application.

In one embodiment, the data associated with the second application is generated by retrieving initial data from the second application using the one or more native APIs of the second application and applying integration logic to the initial data to generate the data. The integration logic may comprise at least one of method chaining, looping, or data transformations. The one or more process extension APIs perform functions not available on native APIs of the second application to generate the data.

In one embodiment, the receiving, the generating, and the transmitting are performed by a connector and the connector further comprises one or more system extension APIs for generating discovery data relating to the connector. The discovery data may comprise at least one of: 1) metadata of the connector, 2) events available on the connector, 3) objects, resources, or methods available on the connector, 4) metadata of the objects, the resources, or the methods available on the connector, or 5) test results of a connection. In one embodiment, the discovery data describes available resources of the connector as being a native resource or a custom resource. In one embodiment, the discovery data comprises an identification of available fields of a document. In one embodiment, the one or more process extension APIs are created based on the discovery data.

These and other advantages of the invention will be apparent to those of ordinary skill in the art by reference to the following detailed description and the accompanying drawings.

DETAILED DESCRIPTION

Embodiments described herein provide for a central integration platform to facilitate the exchange of data between two or more applications. The central integration platform comprises one or more connectors each associated with one of the applications. Each respective connector comprises standard resources representing the native APIs (application programming interfaces) of the associated application, as well as system extensions and process extensions. The system extensions are APIs for generating discovery data relating to the respective connector. The process extensions are APIs extending capabilities of the native APIs of the associated application by abstracting complex integration logic to provide functions for specific use cases. Advantageously, a connector in accordance with embodiments described herein provides for system extensions for generating discovery data relating to the connector to thereby facilitate the adoption of the connector, as well as process extensions to provide functionality for specific use cases to thereby extend the capabilities of the native APIs of the application.

Figure 1:
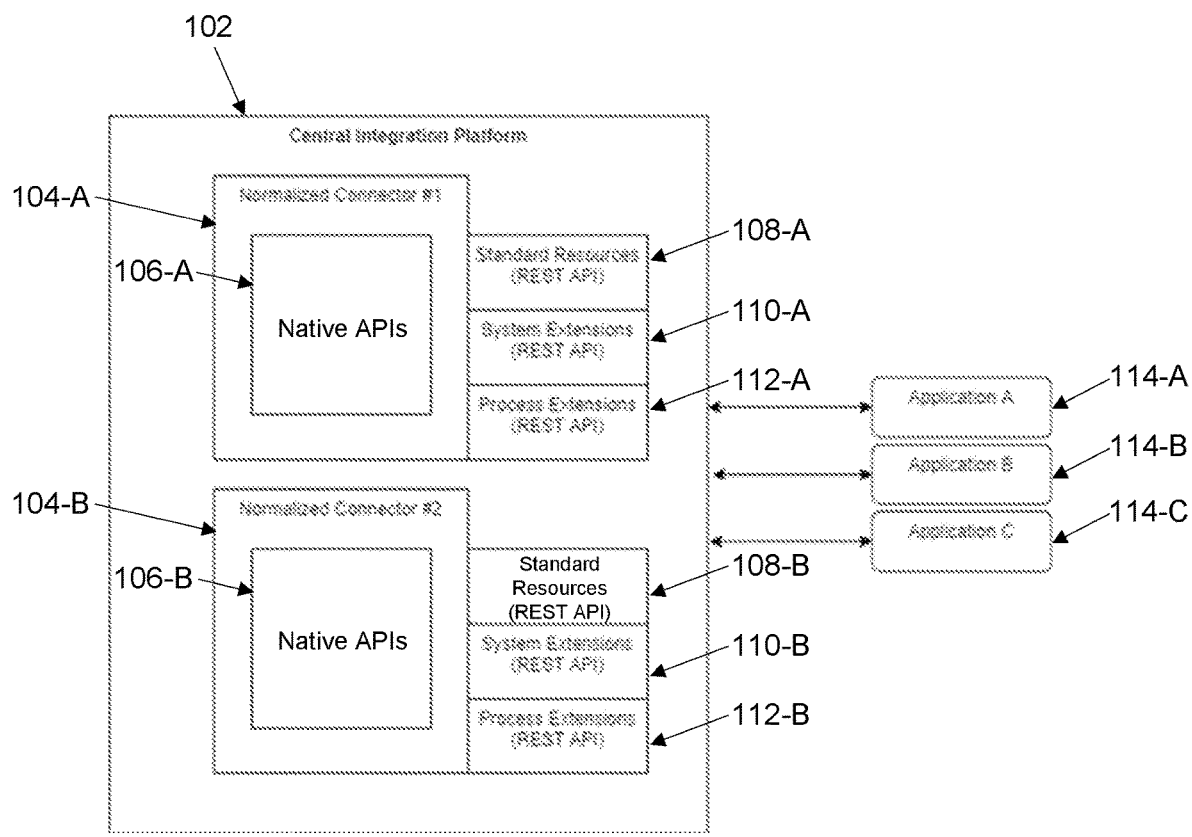
FIG. 1 is a schematic diagram of a system for facilitating the exchange of data between two or more applications, in accordance with one or more embodiments.

FIG. 1 shows a schematic diagram of a system 100 for facilitating the exchange of data between two or more applications, in accordance with one or more embodiments. As shown in FIG. 1, central integration platform 102 facilitates the exchange of data between two or more of Application A 114-A, Application B 114-B, and Application C 114-C (collectively referred to as applications 114). Applications 114 may be software programs, mobile apps, websites, systems, devices, or any other suitable application.

Central integration platform 102 comprises normalized connectors 104-A and 104-B (collectively referred to as normalized connectors 104) each associated with a respective application 114. Normalized connectors 104 provide a normalized interface for communicating with their associated application 114. In particular, normalized connectors 104 interface with native APIs 106-A and 106-B (collectively referred to as native APIs 106) representing the native APIs of their associated application 114 and respectively provide a normalized interface comprising standard resources 108-A and 108-B (collectively referred to as standard resources 108), system extensions 110-A and 110-B (collectively referred to as system extensions 110), and process extensions 112-A and 112-B (collectively referred to as process extensions 112). Native APIs 106, standard resources 108, system extensions 110, and process extensions 112 may be implemented according to any protocol or standard, such as, e.g., SOAP (simple object access protocol), ODATA (open data protocol), SDK (software development kit), and REST (representational state transfer). In one embodiment, standard resources 108, system extensions 110, and process extensions 112 are implemented according to the REST protocol with JSON (JavaScript object notation) payload.

Standard resources 108 comprises a normalized version of native APIs 106. Native APIs 106 may be normalized according to any suitable, known approach.

System extensions 110 comprises APIs for generating discovery data relating to their respective normalized connector 104. System extensions 110 provide a consistent set of APIs to enable a user (e.g., a developer or engineer) to rapidly integrate normalized connector 104 with applications 114, regardless of the application or the API protocol or standard associated with the application. The discovery data generated by system extensions 110 is self-describing data relating to its respective normalized connector 104 to enable applications 114 to leverage the full flexibility of normalized connectors 104 in a dynamic manner. The discovery data allows the application consuming the connector to understand what data objects are available, and the payload/fields available on these objects. Any application consuming the connector can create user experiences to interact with the data of the business application in a dynamic way. The application consuming the connector can dynamically present the available objects and their data fields to the end user without needing to know anything about the business application itself.

In one embodiment, the discovery data generated by system extensions 110 may comprise: 1) discovery data of metadata of the normalized connector 104 (e.g., capabilities supported by normalized connector 104, authentication type supported by normalized connector 104, the native APIs 106 leveraged by normalized connector 104, etc.); 2) discovery data of events available on the normalized connector 104 (e.g., changes in the objects, resources, or methods of normalized connector 104); 3) discovery data of objects, resources, or methods available on the normalized connector 104; 4) discovery data of the metadata of objects, resources, methods of the normalized connector 104 (e.g., input and output models available on normalized connector 104, whether an object is custom or standard, self-describing metadata about normalized connector 104 (e.g., name, version, description, search tags, lifecycle stage, etc.), operations and capabilities that are available on normalized connector 104 (e.g., supports events, supports bulk, supports search, etc.), categorization of the object, resource, or method, etc.); and 5) discovery data of test results of a connection when the normalized connector 104 is authenticated. In one embodiment, the discovery data generated by system extensions 110 may describe all available resources (e.g., functionality) of normalized connector 104 as being a part of standard resource 108 (i.e., a native resource of the application 114) or a custom resource (i.e., a resource of system extensions 110 or process extensions 112), and may logically categorize the resources (e.g., as being standard or custom). In one embodiment, if a certain resource is called, system extensions 110 may generate discovery data all the way down to the field level. For example, an invoice resource API of system extensions 110 may be called for identifying what fields of an invoice are available and searching the identified fields for foreign keys, primary keys, and specific values of specific fields for feeding into models.

Process extensions 112 comprise APIs extending capabilities of the native APIs 106 of the associated application by abstracting complex integration logic to provide functions for specific use cases (or business processes). The APIs of process extensions 112 may be reused for the specific use cases. In one embodiment, the functionality of process extensions 112 is not available in native APIs 106 of the application 114. In this manner, process extensions 112 extend the functionality of native APIs 106. By abstracting complex integration logic, process extensions 112 may be utilized by users who may not be experts in the business workings and technical API nuances to implement a specific use case. Process extensions 112 may be created, modified, and published by, e.g., expert users and made available via normalized connector 104 to provide a consistent interface for developing integration for an application 114.

In one embodiment, process extensions 112 are created based on the discovery data generated by system extensions 110. A user configures the steps that happen in between process extensions 112 receiving the input and generating the output. The configuration of process extensions 112 leverages the connector system extensions 110 to present a user interface to end users with the connector capabilities and API endpoints that are available to work with to define the process. Steps for configuring process extensions 112 can include, for example, (multiple) API calls to an application, writing custom code, data mapping, decision trees, error management, etc. In one example, process extensions 112 may comprise an API triggered based on events discovered by systems extensions 110. The integration logic implementing process extensions 112 may comprise complex logic, such as, e.g., method chaining, looping, custom code, integration with other components or systems, data transformations, combining multiple data results into a single response, etc. The end result is the output that process extensions 112 will return to the connector 104 consuming application. By exposing the API endpoints of process extensions 112, any application 114 can be made to integrate in an identical manner, and the integration logic can be rapidly exposed for adoption by any application that consume central integration platform 102. Advantageously, each application 114 can avoid implementing duplicate logic in every application and rely on consistent data to solve a business challenge.

One exemplary use case for process extensions 112 is for submitting a payment to an invoice. This use case is implemented different for different types of systems (e.g., NetSuite ERP (enterprise resource planning) vs. SAP S/4HANA vs. Sage Intacct). Process extensions 112 provides a normalized API interface that abstracts the nuances for each of the systems and provides a single unified interface to the user to submit payment without having to worry about the differences amongst each.

Figure 2:
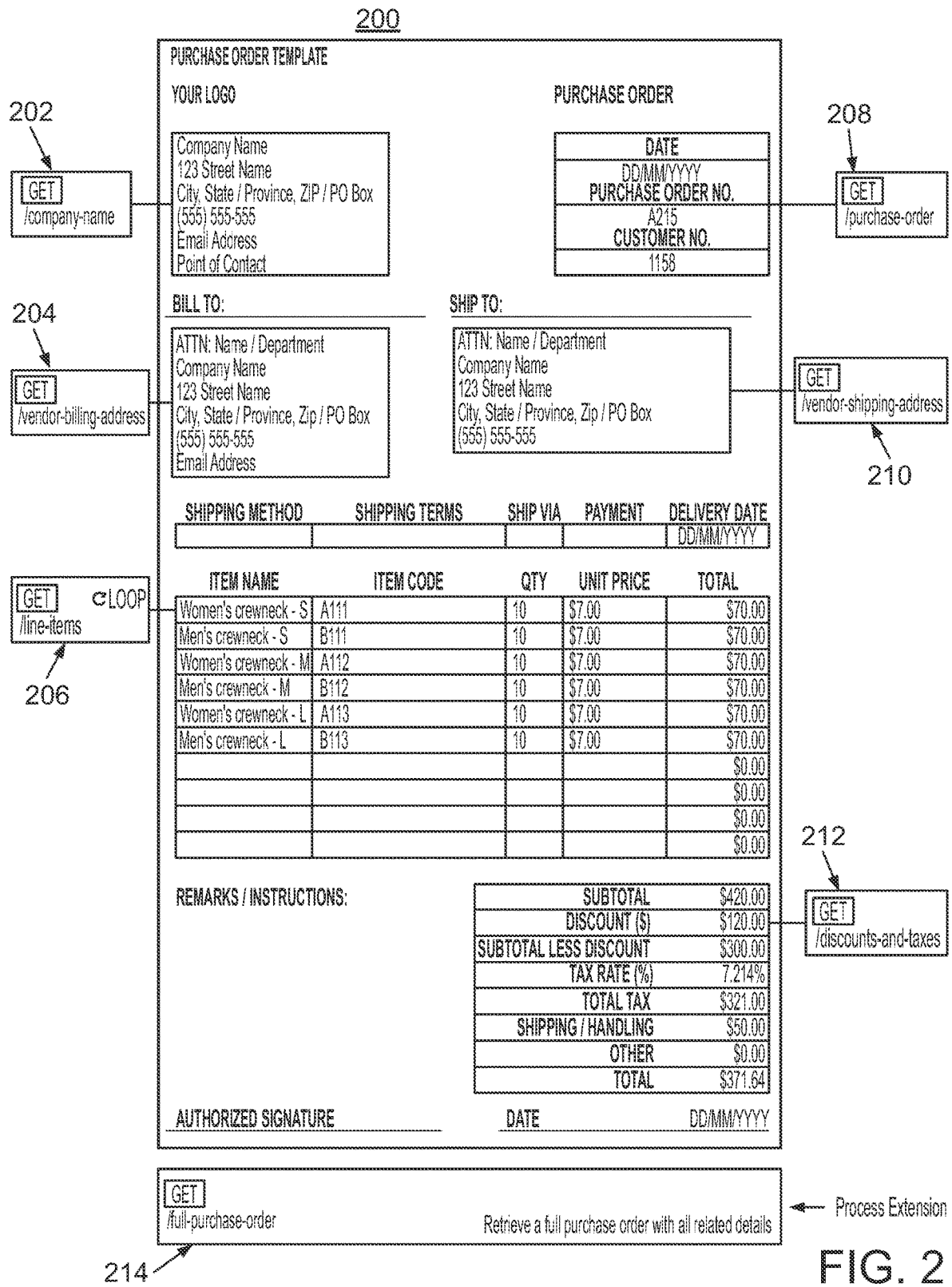
FIG. 2 shows an exemplary purchase order template generated in accordance with one or more embodiments.

Another exemplary use case for process extensions 112 is for retrieving data for completing a purchase order. This use case presents unique challenges across various systems that store purchase order data. For instance, System A may store all data via a single API, however System B may require a user first retrieve the raw purchase order data, after which calls must be made to one or more subsequent APIs to obtain company information, the billing address, line items, discount information, etc. Process extensions 112 provide for APIs to retrieve purchase orders without needing to manage the complexity or needing to know the nuances of every external system. FIG. 2 shows an exemplary purchase order template 200 generated in accordance with one or more embodiments. Purchase order template 200 is generated by calling process extensions API 214, which retrieves information for completing purchase order template 200 via APIs 202-212. API 202 is for retrieving company name, API 204 is for retrieving vendor billing address, API 206 is for retrieving line items, API 208 is for retrieving purchase order number, API 210 is for retrieving vendor shipping address, and API 212 is for retrieving discounts and taxes.

Figure 3:
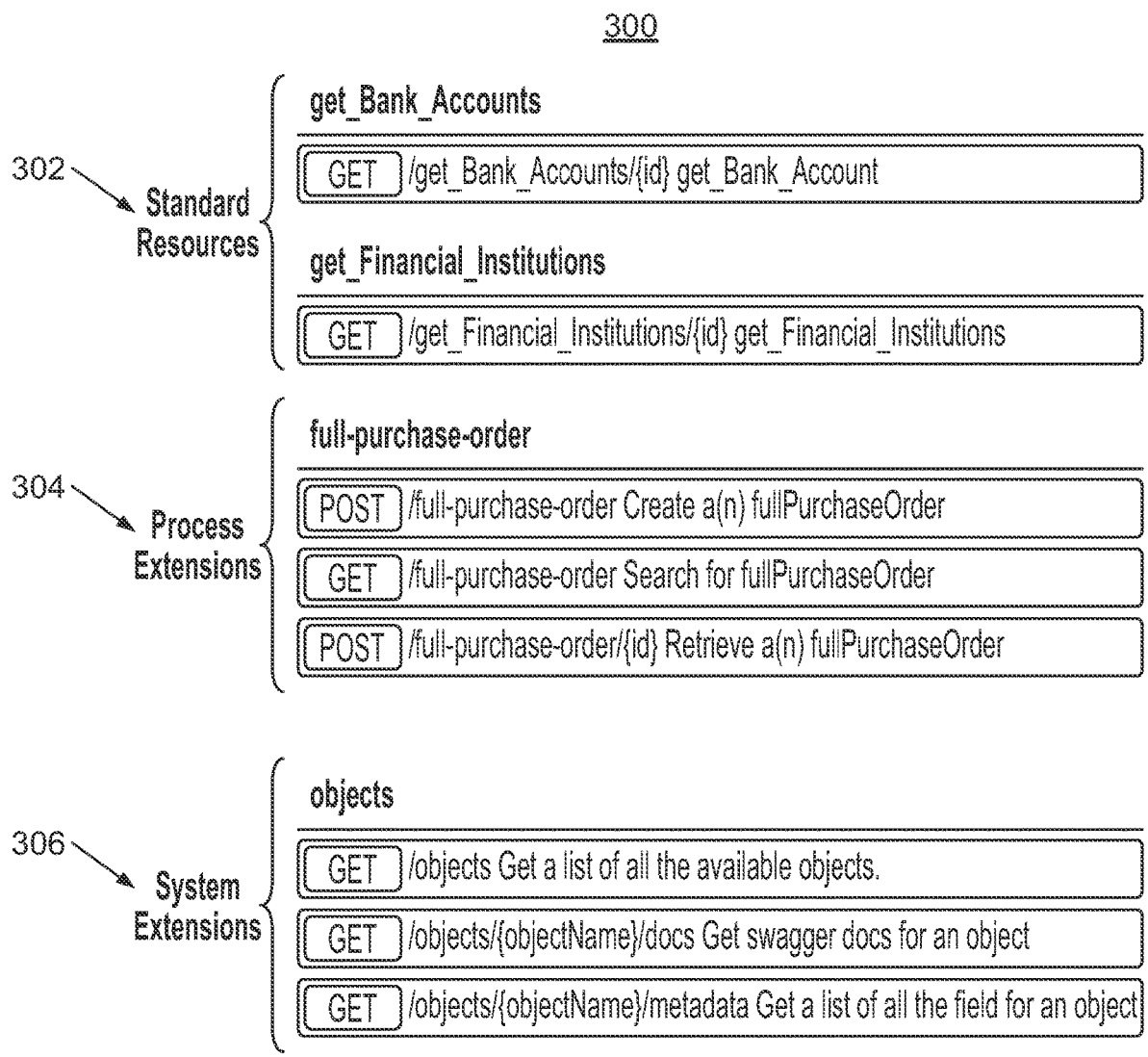
FIG. 3 shows a diagram of exemplary APIs (application programming interfaces), in accordance with one or more embodiments.

FIG. 3 shows a diagram 300 of exemplary APIs, in accordance with one or more embodiments. Diagram 300 shows APIs for standard resources 302, process extensions 304, and system extensions 306. In one example, standard resources 302 are standard resources 108 of FIG. 1, process extensions 304 are process extensions 112 of FIG. 1, and system extensions 306 are system extensions 110 of FIG. 1. Standard resources 301 comprise APIs for getting bank accounts and getting financial institutions. Process extensions 304 comprise APIs for creating a full purchase order, searching for a full purchase order, and retrieving a full purchase order by ID. System extensions 306 comprise APIs for getting a list of all available objects, getting swagger docs for an object, and getting a list of all fields for an object.

Figure 4:
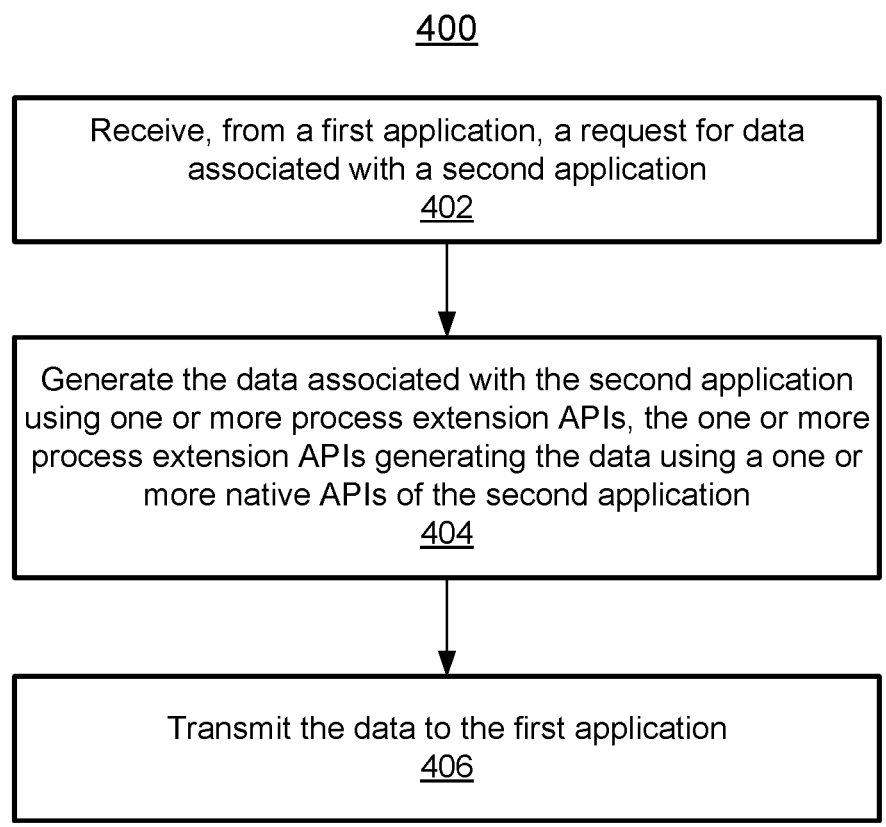
FIG. 4 shows a method for retrieving data from an application, in accordance with one or more embodiments.

FIG. 4 shows a method 400 for retrieving data from an application, in accordance with one or more embodiments. Method 400 may be performed by any suitable computing device or devices, such as, e.g., computing system 500 of FIG. 5. Method 400 will be described with continued reference to FIG. 1. In one embodiment, the steps of method 400 are performed by a connector, such as, e.g., normalized connector 104-A or 104-B of central integration platform 102 of FIG. 1.

At step 402 of FIG. 4, a request for data associated with a second application is received from a first application. The first and second applications may be software programs, mobile apps, websites, systems, devices, or any other suitable application. In one example, the first and second applications are different ones of applications 114 of FIG. 1. In addition to requesting the data (e.g., for a single object), data sets of multiple objects (e.g., lists) may also be retrieved, data (e.g., create/update) may be pushed to the second application, or deletion of data in the second application may be requested. In one embodiment, the request is received by a connector, such as normalized connector 104-A or 104-B of FIG. 1. In one embodiment, the first application is the application consuming the connector and the connector APIs and the second application is the business system for which the connector was created and of which the connector consumes the APIs. Accordingly, integration logic from the first application is abstracted to avoid dealing with the complexity when integrating with the second application.

At step 404 of FIG. 4, the data associated with the second application is generated using one or more process extension APIs. The one or more process extension APIs generate the data using one or more native APIs of the second application. In one embodiment, the data is generated by the connector.

The one or more process extension APIs are APIs created on the connector that extend the capabilities of the native APIs of the second application by generating the data for a specific use case. In one embodiment, the one or more process extension APIs retrieve initial data from the second application using one or more native APIs of the second application and apply complex integration logic to the initial data to generate the data. The complex integration logic may comprise, for example, method chaining, looping, custom code, integration with other components or systems, data transformations, combining multiple data results into a single response, etc. In one embodiment, the one or more process extension APIs perform functions not available on the native APIs of the second application to generate the data. In one example, the one or more process extension APIs are process extensions 112 of FIG. 1 of normalized connector 104 of FIG. 1 and the one or more native APIs may be standard resources 108 of FIG. 1.

In one embodiment, the connector may also comprise one or more system extension APIs. The one or more system extension APIs are APIs created on the connector for generating discovery data relating to the respective connector. In one example, the one or more system extension APIs are system extensions 110 of FIG. 1. The discovery data facilitates adoption by the second application. In one embodiment, the one or more process extension APIs are created based on the discovery data.

Figure 5:
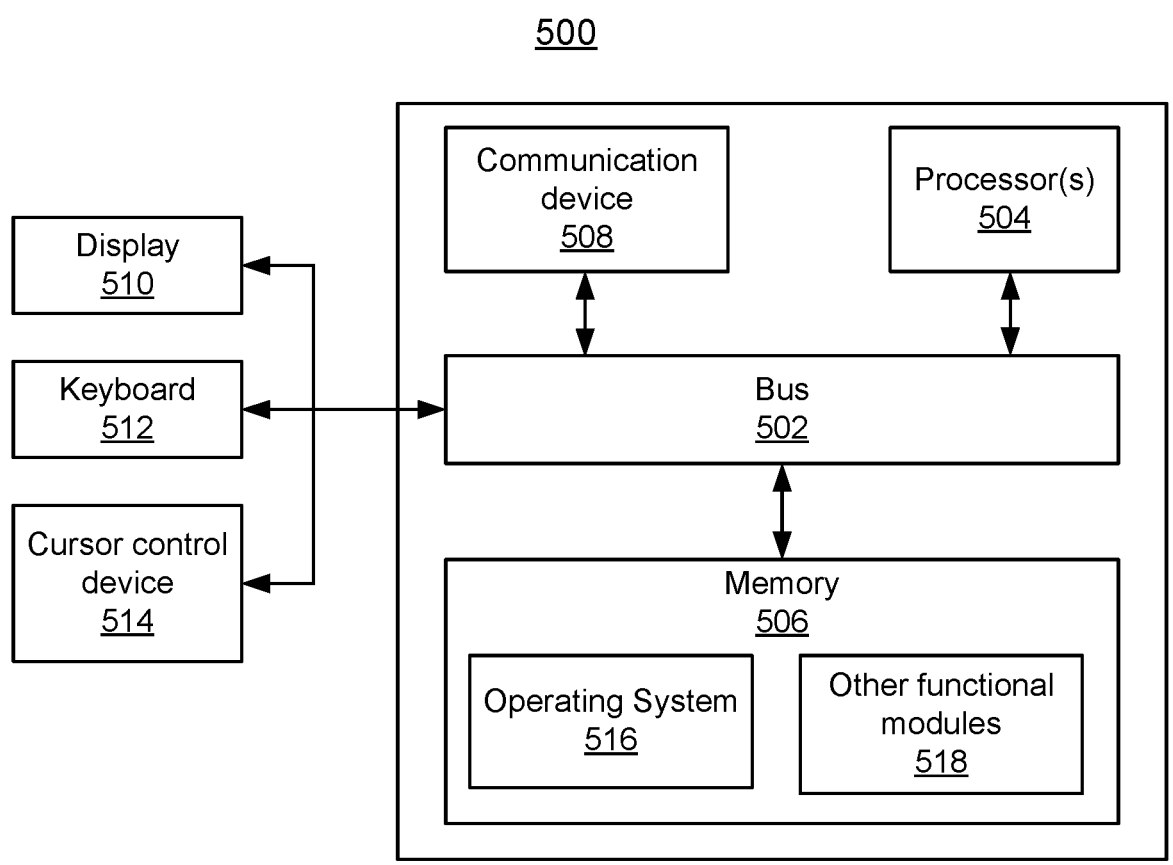
FIG. 5 is a block diagram of a computing system, which may be used to implemented embodiments of the invention.

At step 406 of FIG. 4, the data is transmitted to the first application. In some embodiments, the data may additionally or alternatively be output by displaying the data on a display device of a computer system, storing the data on a memory or storage of a computer system, or by transmitting the data to a remote computer system FIG. 5 is a block diagram illustrating a computing system 500. Computing system 500 may be configured to execute the methods, workflows, and processes described herein, including method 400 of FIG. 4, or may be configured to implement systems described herein, including central integration platform 102 of FIG. 1, according to one or more embodiments of the present invention. In some embodiments, computing system 500 may be one or more of the computing systems depicted and/or described herein. Computing system 500 includes a bus 502 or other communication mechanism for communicating information, and processor(s) 504 coupled to bus 502 for processing information. Processor(s) 504 may be any type of general or specific purpose processor, including a Central Processing Unit (CPU), an Application Specific Integrated Circuit (ASIC), a Field Programmable Gate Array (FPGA), a Graphics Processing Unit (GPU), multiple instances thereof, and/or any combination thereof. Processor(s) 504 may also have multiple processing cores, and at least some of the cores may be configured to perform specific functions. Multi-parallel processing may be used in some embodiments.

Computing system 500 further includes a memory 506 for storing information and instructions to be executed by processor(s) 504. Memory 506 can be comprised of any combination of Random Access Memory (RAM), Read Only Memory (ROM), flash memory, cache, static storage such as a magnetic or optical disk, or any other types of non-transitory computer-readable media or combinations thereof. Non-transitory computer-readable media may be any available media that can be accessed by processor(s) 504 and may include volatile media, non-volatile media, or both. The media may also be removable, non-removable, or both.

Additionally, computing system 500 includes a communication device 508, such as a transceiver, to provide access to a communications network via a wireless and/or wired connection according to any currently existing or future-implemented communications standard and/or protocol.

Processor(s) 504 are further coupled via bus 502 to a display 510 that is suitable for displaying information to a user. Display 510 may also be configured as a touch display and/or any suitable haptic I/O device.

A keyboard 512 and a cursor control device 514, such as a computer mouse, a touchpad, etc., are further coupled to bus 502 to enable a user to interface with computing system. However, in certain embodiments, a physical keyboard and mouse may not be present, and the user may interact with the device solely through display 510 and/or a touchpad (not shown). Any type and combination of input devices may be used as a matter of design choice. In certain embodiments, no physical input device and/or display is present. For instance, the user may interact with computing system 500 remotely via another computing system in communication therewith, or computing system 500 may operate autonomously.

Memory 506 stores software modules that provide functionality when executed by processor(s) 504. The modules include an operating system 516 for computing system 500 and one or more additional functional modules 518 configured to perform all or part of the processes described herein or derivatives thereof.

One skilled in the art will appreciate that a "system" could be embodied as a server, an embedded computing system, a personal computer, a console, a personal digital assistant (PDA), a cell phone, a tablet computing device, a quantum computing system, or any other suitable computing device, or combination of devices without deviating from the scope of the invention. Presenting the above-described functions as being performed by a "system" is not intended to limit the scope of the present invention in any way, but is intended to provide one example of the many embodiments of the present invention. Indeed, methods, systems, and apparatuses disclosed herein may be implemented in localized and distributed forms consistent with computing technology, including cloud computing systems.

It should be noted that some of the system features described in this specification have been presented as modules, in order to more particularly emphasize their implementation independence. For example, a module may be implemented as a hardware circuit comprising custom very large scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices, graphics processing units, or the like. A module may also be at least partially implemented in software for execution by various types of processors. An identified unit of executable code may, for instance, include one or more physical or logical blocks of computer instructions that may, for instance, be organized as an object, procedure, or function. Nevertheless, the executables of an identified module need not be physically located together, but may include disparate instructions stored in different locations that, when joined logically together, comprise the module and achieve the stated purpose for the module. Further, modules may be stored on a computer-readable medium, which may be, for instance, a hard disk drive, flash device, RAM, tape, and/or any other such non-transitory computer-readable medium used to store data without deviating from the scope of the invention. Indeed, a module of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

The foregoing merely illustrates the principles of the disclosure. It will thus be appreciated that those skilled in the art will be able to devise various arrangements that, although not explicitly described or shown herein, embody the principles of the disclosure and are included within its spirit and scope. Furthermore, all examples and conditional language recited herein are principally intended to be only for pedagogical purposes to aid the reader in understanding the principles of the disclosure and the concepts contributed by the inventor to furthering the art, and are to be construed as being without limitation to such specifically recited examples and conditions. Moreover, all statements herein reciting principles, aspects, and embodiments of the disclosure, as well as specific examples thereof, are intended to encompass both structural and functional equivalents thereof. Additionally, it is intended that such equivalents include both currently known equivalents as well as equivalents developed in the future.

What is claimed is:

1. A computer-implemented method comprising:
   generating, by one or more system extension APIs of a connector, discovery data relating to the connector, wherein the discovery data 1) describes available resources of the connector as being a native resource or a custom resource and 2) comprises an identification of available fields of a document;
   creating one or more process extension APIs of the connector based on the discovery data;
   receiving, by the connector from a first application, a request for data associated with a second application;
   generating, by the connector, the requested data associated with the second application by:
      retrieving initial data from the second application using native APIs of the second application, and
      performing, by the one or more process extension APIs of the connector, one or more functions by applying integration logic to the retrieved initial data to generate the requested data, wherein the one or more functions performed by the one or more process extension APIs are not available on the native APIs of the second application; and
   transmitting, by the connector, the requested data to the first application.

2. The computer-implemented method of claim 1, wherein the integration logic comprises at least one of method chaining, looping, or data transformations.

3. The computer-implemented method of claim 1, wherein the discovery data comprises at least one of: 1) metadata of the connector, 2) events available on the connector, 3) objects, resources, or methods available on the connector, 4) metadata of the objects, the resources, or the methods available on the connector, or 5) test results of a connection.

4. An apparatus comprising:
   a memory storing computer program instructions; and
   at least one processor configured to execute the computer program instructions, the computer program instructions configured to cause the at least one processor to perform operations comprising:
   generating, by one or more system extension APIs of a connector, discovery data relating to the connector, wherein the discovery data 1) describes available resources of the connector as being a native resource or a custom resource and 2) comprises an identification of available fields of a document;
   creating one or more process extension APIs of the connector based on the discovery data;
   receiving, by the connector from a first application, a request for data associated with a second application;
   generating, by the connector, the requested data associated with the second application by:
      retrieving initial data from the second application using native APIs of the second application, and
      performing, by the one or more process extension APIs of the connector, one or more functions by applying integration logic to the retrieved initial data to generate the requested data, wherein the one or more functions performed by the one or more process extension APIs are not available on the native APIs of the second application; and transmitting, by the connector, the requested data to the first application.

5. The apparatus of claim 4, wherein the integration logic comprises at least one of method chaining, looping, or data transformations.

6. The apparatus of claim 4, wherein the discovery data comprises at least one of: 1) metadata of the connector, 2) events available on the connector, 3) objects, resources, or methods available on the connector, 4) metadata of the objects, the resources, or the methods available on the connector, or 5) test results of a connection.

7. A non-transitory computer-readable medium storing computer program instructions, the computer program instructions, when executed on at least one processor, cause the at least one processor to perform operations comprising:

generating, by one or more system extension APIs of a connector, discovery data relating to the connector, wherein the discovery data 1) describes available resources of the connector as being a native resource or a custom resource and 2) comprises an identification of available fields of a document;

creating one or more process extension APIs of the connector based on the discovery data;

receiving, by the connector from a first application, a request for data associated with a second application;

generating, by the connector, the requested data associated with the second application by:

retrieving initial data from the second application using native APIs of the second application, and performing, by the one or more process extension APIs of the connector, one or more functions by applying integration logic to the retrieved initial data to generate the requested data, wherein the one or more functions performed by the one or more process extension APIs are not available on the native APIs of the second application; and transmitting, by the connector, the requested data to the first application.

8. The non-transitory computer-readable medium of claim 7, wherein the discovery data comprises at least one of: 1) metadata of the connector, 2) events available on the connector, 3) objects, resources, or methods available on the connector, 4) metadata of the objects, the resources, or the methods available on the connector, or 5) test results of a connection.

9. The non-transitory computer-readable medium of claim 7, wherein the integration logic comprises at least one of method chaining, looping, or data transformations.

* * * * *